(12) United States Patent
Ishikawa et al.

(10) Patent No.: US 8,010,666 B2
(45) Date of Patent: *Aug. 30, 2011

(54) IDENTIFICATION AND TRACKING OF DIGITAL CONTENT DISTRIBUTORS ON WIDE AREA NETWORKS

(75) Inventors: Mark M. Ishikawa, Los Gatos, CA (US); Travis Hill, Cedar Hills, UT (US); Lawrence Low, San Francisco, CA (US)

(73) Assignee: BayTSP.com, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,492

(22) Filed: Mar. 30, 2010

(65) Prior Publication Data

US 2010/0235475 A1 Sep. 16, 2010

Related U.S. Application Data

(63) Continuation of application No. 11/103,821, filed on Apr. 11, 2005, now Pat. No. 7,716,324, which is a continuation-in-part of application No. 10/845,436, filed on May 12, 2004, now Pat. No. 7,730,176.

(51) Int. Cl.
*G06F 15/16* (2006.01)
*G06F 15/173* (2006.01)
(52) U.S. Cl. ...................................... 709/224; 709/217
(58) Field of Classification Search .................. 709/217, 709/224, 231
See application file for complete search history.

(56) References Cited

U.S. PATENT DOCUMENTS

| 6,339,785 | B1* | 1/2002 | Feigenbaum | 709/213 |
| 6,374,289 | B2* | 4/2002 | Delaney et al. | 709/203 |
| 2002/0152261 | A1* | 10/2002 | Arkin et al. | 709/202 |
| 2003/0095660 | A1* | 5/2003 | Lee et al. | 380/231 |

* cited by examiner

*Primary Examiner* — Brian J Gillis
(74) *Attorney, Agent, or Firm* — Osama Hussain, Esq.

(57) ABSTRACT

A system and method for tracking and identifying digital content distributors using file sharing networks. The system monitors distribution networks, logs pertinent network and distributor information, generates network statistics, gathers evidence of content distribution, and notifies interested parties of the availability of content on file sharing networks.

20 Claims, 6 Drawing Sheets

IDENTIFICATION AND TRACKING OF DIGITAL CONTENT DISTRIBUTORS ON WIDE AREA NETWORKS

CROSS-REFERENCE TO RELATED APPLICATIONS

This application is a continuation of U.S. patent application Ser. No. 11/103,821, filed on Apr. 11, 2005, now U.S. Pat. No. 7,716,324 which is a continuation-in-part of U.S. patent application Ser. No. 10/845,436, filed on May 12, 2004 now U.S. Pat. No. 7,730,176. Priority to the above patent applications is expressly claimed, and the disclosures of the applications are hereby incorporated herein by reference in their entireties and for all purposes.

BACKGROUND

1. Field

The present disclosure relates generally to the field of digital content distribution, and in particular to the identification and tracking of digital content distributors on Wide Area Networks.

2. Related Art

Unauthorized distribution of copyrighted digital content on the Internet and other Wide Area Networks (WANs) is a growing problem. The existing systems and methods aimed at identification of digital content distributors are conducted on an ad hoc basis, for example by manually searching for a file representing a piece of copyrighted content on a file sharing network and making a note of user names and IP addresses of potential distributors advertising the file. The problem with these preexisting approaches is that they are inefficient and not scalable. Accordingly, a need exists for an efficient and automated system for identification and tracking of digital content distributors on WANs.

SUMMARY

The present disclosure relates to a system and method for tracking and identifying digital content distributors on Wide Area Networks. The present system monitors distribution networks, logs pertinent network and distributor information, generates network statistics, gathers evidence of content distribution, and notifies interested parties of the availability of content on Wide Area Networks.

DETAILED DESCRIPTION

The following serves as a glossary of terms as used herein:

Digital content—A digital representation of an image, video, audio, text, software or other data.

Wide Area Network (WAN)—A network of communicating nodes, wherein some of the nodes are geographically dispersed, such as covering a distance between buildings, cities or countries.

File sharing network—A network of nodes communicating according to a protocol allowing the sharing of digital content among the nodes.

File sharing network client application—An application for connecting to a file sharing network and sharing digital content over the file sharing network.

Single-source download—A download of a piece of digital content, wherein the downloaded fragments of the piece originate from a single source node, for example from a single IP address.

Multi-source download—A download of a piece of digital content, wherein the downloaded fragments of the piece originate from a plurality of source nodes, for example from a plurality of IP addresses.

External file hash—A hash value associated with a file, wherein the hash value is assigned by a distribution network (such as a file sharing network) and made available as a search key for the file.

Internal file hash—A hash value associated internally (by the present disclosure) with a file in the primary database, the hash value serving as a fingerprint for identifying similar or duplicate digital content.

Figure 1:
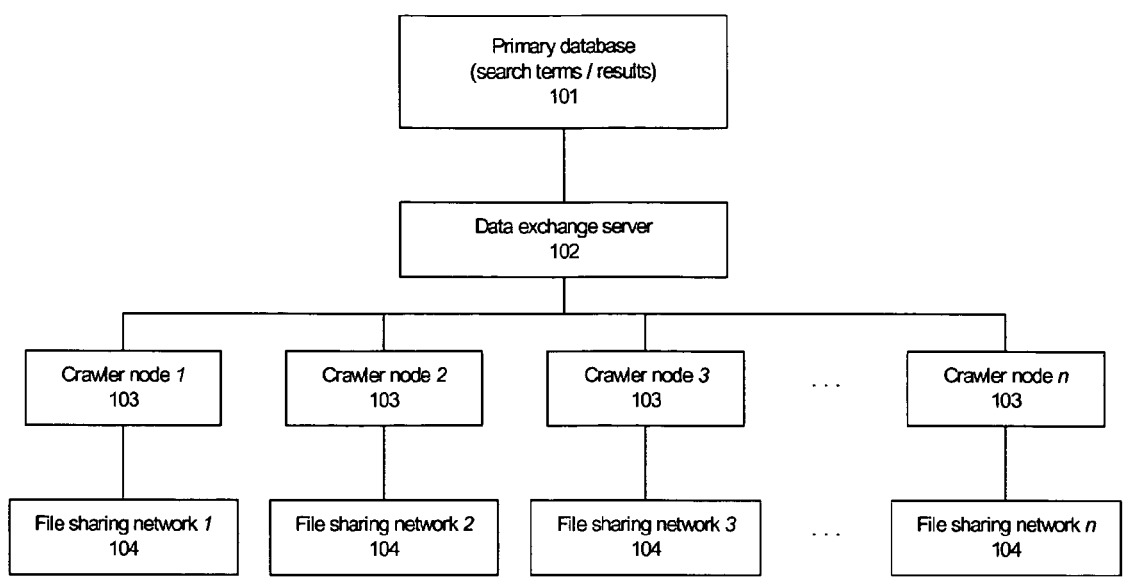
FIG. 1 is a block diagram showing a system for identification and tracking of digital content distributors, comprising a primary database 101, a data exchange server 102, and one or more crawler nodes 103, according to an embodiment of the present disclosure.

FIG. 1 is a block diagram showing a system for identification and tracking of digital content distributors, comprising a primary database 101, a data exchange server 102, and one or more crawler nodes 103, according to an embodiment of the present disclosure. A crawler node 103 establishes a connection to a Wide Area Network according to a distribution protocol, such as a file sharing network protocol, an IRC (Internet Relay Chat) protocol, a spidering protocol and/or any other content distribution protocol, and initiates a search for a piece of digital content based on one or more search terms. By way of example and not by limitation, the Figures depict crawlers 103 establishing connections to file sharing networks 104 via an appropriate file sharing protocol on a Wide Area Network; however it is understood that other distribution protocols on a Wide Area Network (as recited above) can be used analogously. If a node in file sharing network 104 reports an availability of the sought piece of digital content, crawler node 103 logs such availability and optionally initiates a single-source or a multi-source download of the piece of digital content from the file sharing network 104. The primary database 101 stores search terms for the crawler 103 searches, as well as any search results obtained from crawler node 103. The data exchange server 102 acts as an interface between primary database 101 and crawler nodes 103, retrieving search terms from primary database 101 and providing them to crawler 103, as well as receiving search results from crawler node 103 and storing them in primary database 101. Any two crawler nodes 103 may establish connections with the same file sharing network 104 or with different file sharing networks 104.

Figure 2:
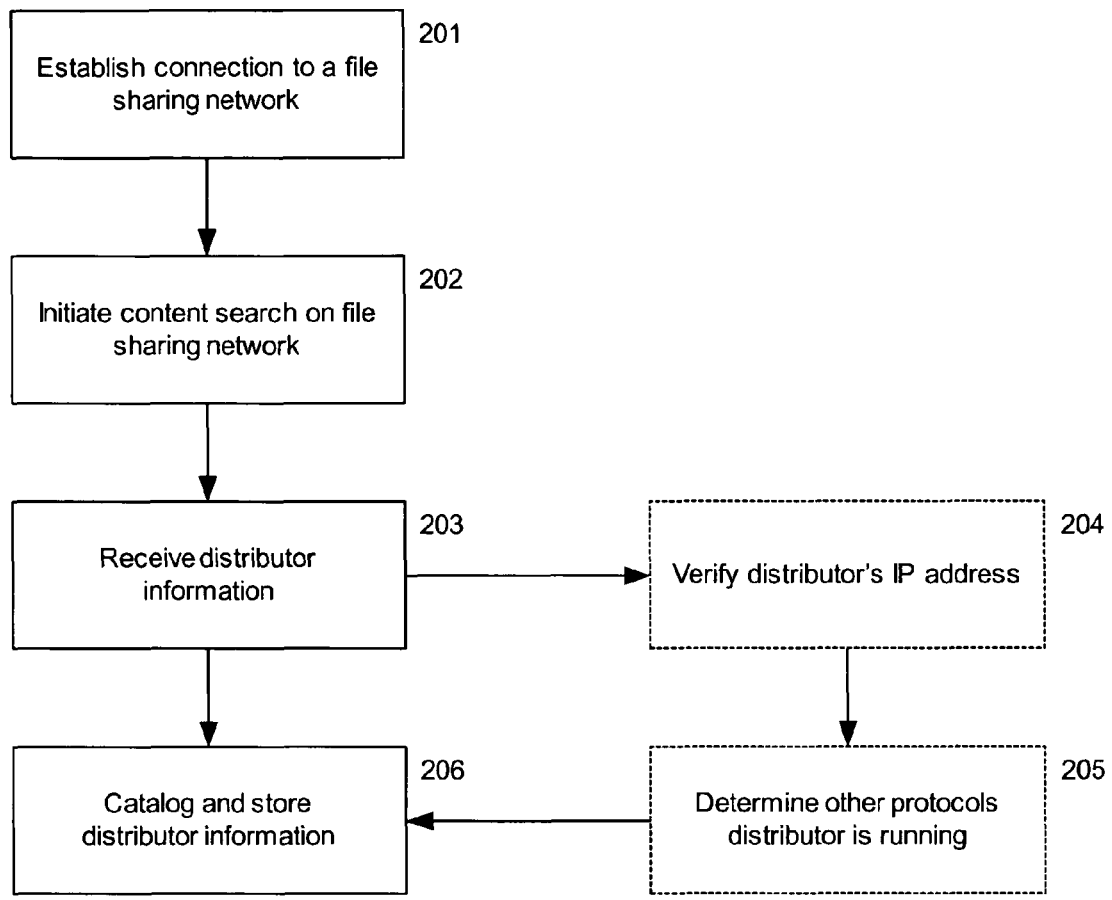
FIG. 2 is a flow diagram showing a method for identification and tracking of digital content distributors, according to an embodiment of the present disclosure.

FIG. 2 is a flow diagram showing a method for identification and tracking of digital content distributors, according to an embodiment of the present disclosure. A crawler node 103 establishes 201 a connection to a file sharing network 104 and initiates 202 a search for a piece of digital content, the search comprising one or more search keywords obtained from primary database 101 via data exchange server 102. Crawler node 103 receives 203 a search result from the file sharing network, the search result indicating one or more distributors (hereinafter also known as suspected distributors) and respective pieces of digital content distributed by the one or more suspected distributors. As an example, such search result comprises an IP address of a suspected distributor, a port number as used by a suspected distributor, a file name, a file size, an external file hash and/or other identifiers which the file sharing network makes available regarding a piece of digital content made available by a suspected distributor, and/or other data about any digital content and suspected distributors. Optionally, verify 204 IP addresses (if obtained) of any suspected distributors. Optionally, determine 205 what other file sharing protocols (if any) are used by such suspected distributors. Finally, log 206 any received and/or verified information about such suspected distributors and digital content, and relay the information to data exchange server 102 for storage in primary database 101. Optionally, perform preliminary filtering on the gathered information prior to sending to data exchange server 102, for example by discarding information pertaining to files whose file names indicate a different content type than the content type under search (e.g. a .AVI video file when we are looking for something like an audio file), or by discarding information pertaining to files that do not match all submitted keywords. Optionally, crawler node 103 also requests statistical information from file sharing network 104, such as the number of users currently using the file sharing network 104, the set of files available on the file sharing network 104, the number of files available on the file sharing network 104, a list of the different versions of any sought piece of digital content available on the file sharing network 104, and/or or any other statistical information about file sharing network 104. If available and supplied by the file sharing network 104, crawler node 103 stores such statistical information in primary server 101.

It may be the case that a file sharing network 104 discloses information about peers (such as IP address, or other information described above) in such as way that the disclosed information is decipherable only by a native client application 113 of the file sharing network 104. This may be accomplished for example by encrypting such information in transit, and having the native client application 113 decrypt the information when needed to make a connection to the respective peers. In such a case, an optional embodiment of the present disclosure launches a native client application 113 of the file sharing network 104, and retrieves such information by performing "memory scraping", wherein memory allocation and memory usage of the client application 113 is monitored.

Figure 3:
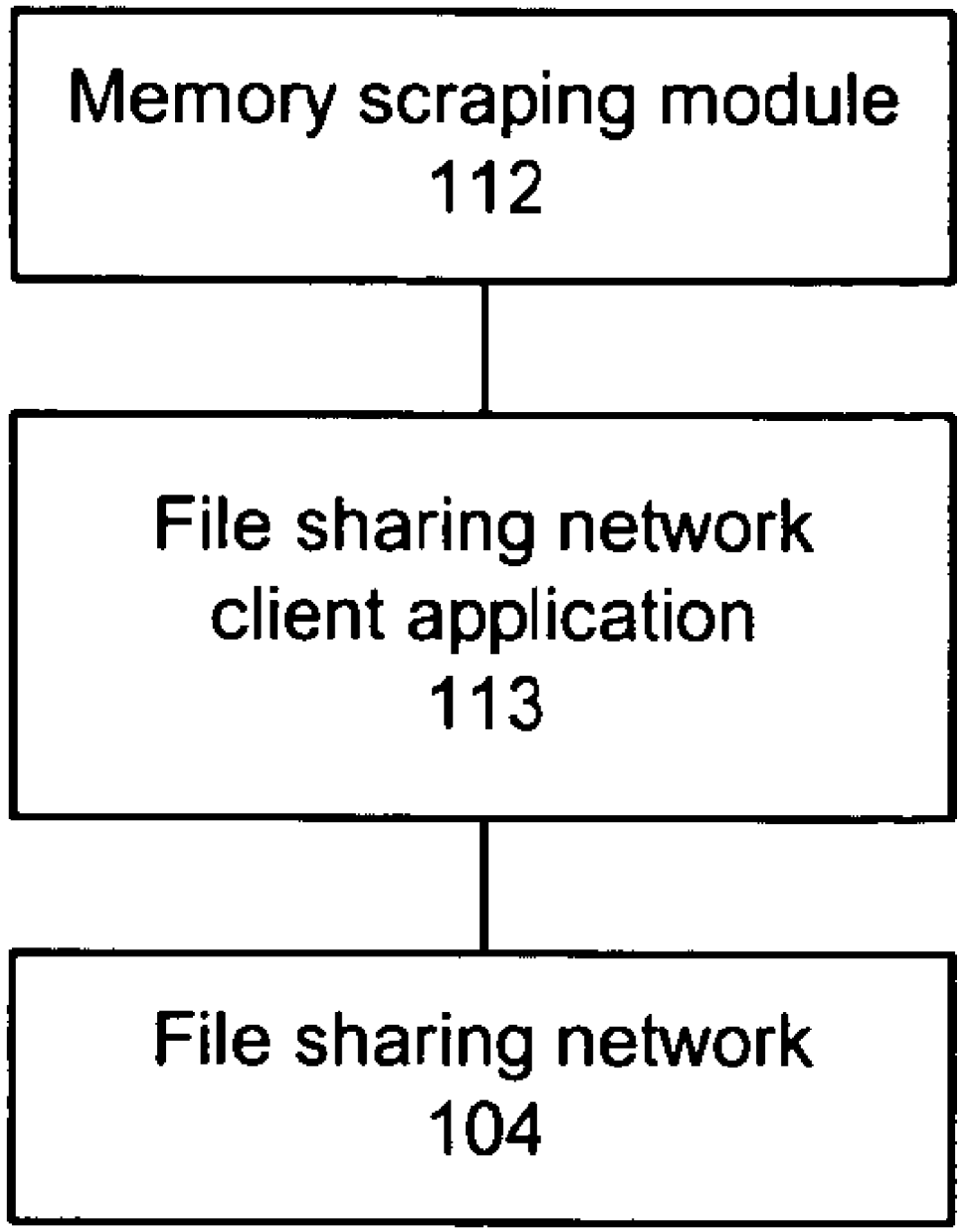
FIG. 3 is a diagram illustrating a memory scraping module 112, according to an embodiment of the present disclosure.

FIG. 3 is a diagram illustrating a memory scraping module 112, according to an embodiment of the present disclosure. With initial user assistance, memory scraping module 112 deduces a pattern in the memory usage of the file sharing network 104 client application 113. A user interacts with the file sharing network client application 113 as the user would normally when seeking out a file, comprising performing a search, examining the search results, and selecting a file for download. At the same time, the memory scraping module 112 monitors changes occurring in memory and deduces the pattern of memory usage for future automated parsing. Once such a pattern is known and stored, memory scraping module 112 applies the pattern to search requests submitted by the file sharing network 104 client application 113 and/or to search results returned to the file sharing network 104 client application 113, and decodes information about distributors, such as IP address, port number, file name, file size, external file hash and/or other identifiers. The information is then parsed into a format suitable for storage into primary database 101.

Figure 4:
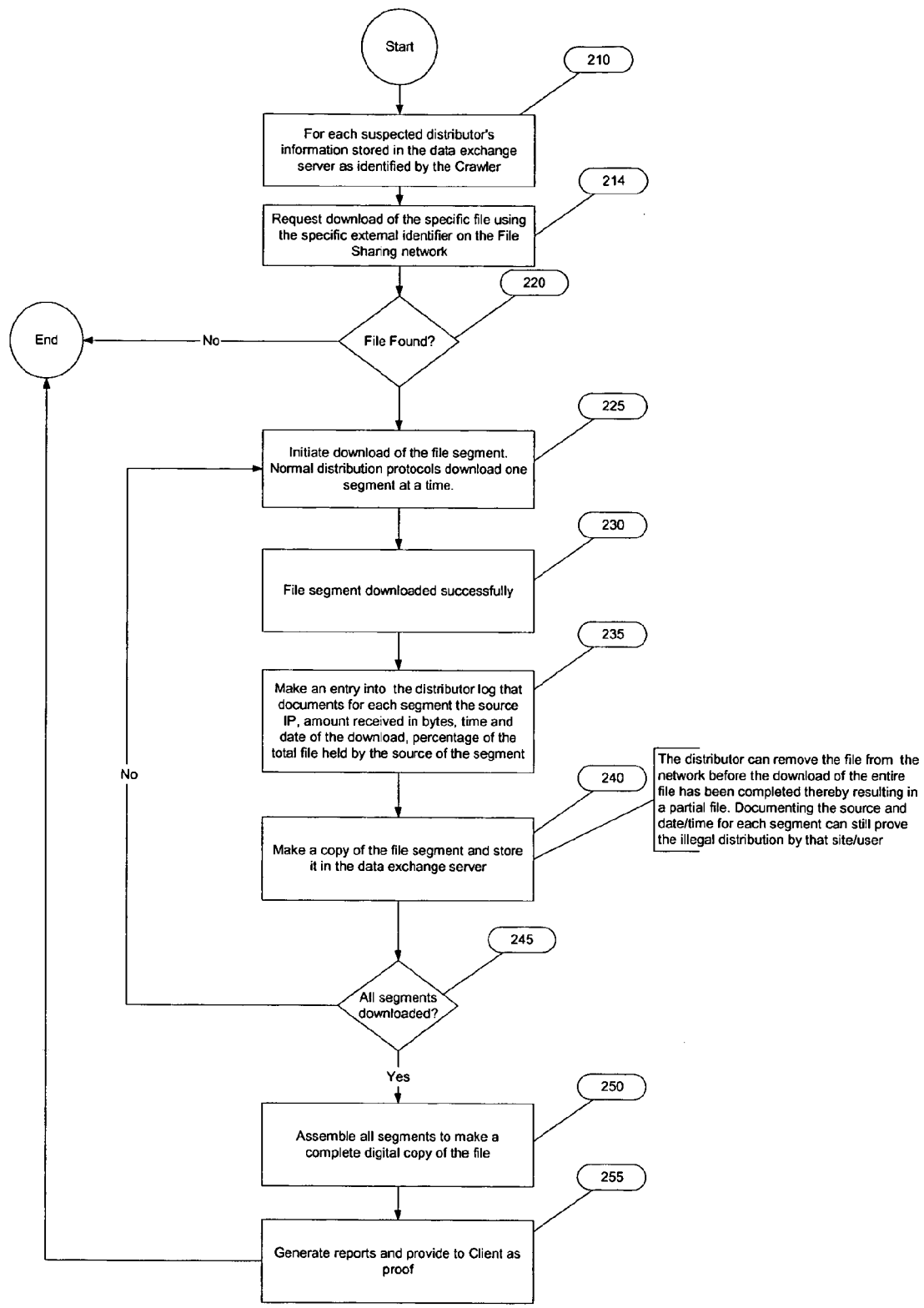
FIG. 4 is a flow diagram showing a method for identification and tracking of digital content distributors, according to an embodiment of the present disclosure.

FIG. 4 is a flow diagram showing a method for identification and tracking of digital content distributors, according to an embodiment of the present disclosure. The present disclosure teaches a method for doing intensive scans of the internet to trace distribution of copyrighted content and track propagation of such content. In this method, for each suspected distributor's information stored in the data exchange server as identified by the crawler 210, download of the specific file using the specific external identifier on the file sharing network in step 214 is requested by an evidence gathering module. If the file is found (step 220) download of the file segment is initiated in step 225. After the download has been completed successfully (step 230) make an entry in the distributor log that documents for each file segment downloaded the source IP address, the amount of file segment received in bytes, sequence number of bytes, time and date of the download, percentage of the total file held by the source of the segment at a given point of time, file name, (step 235.) In step 240 a copy of the file segment is made and stored in the data exchange server. Once a piece of digital content is suspected to have become available for download over a file sharing network, an attempt is made to confirm this suspicion by (a) initiating a multi-source download of the piece of digital content, or by (b) initiating a single-source download of the piece of digital content. Once all segments are downloaded (step 245), the segments are all assembled to make a complete digital copy of the file (step 250.) Thereafter reports may be generated using the information stored in the distributor log and provided to client as proof of distribution of digital content on the file sharing network (step 255.)

Figure 5:
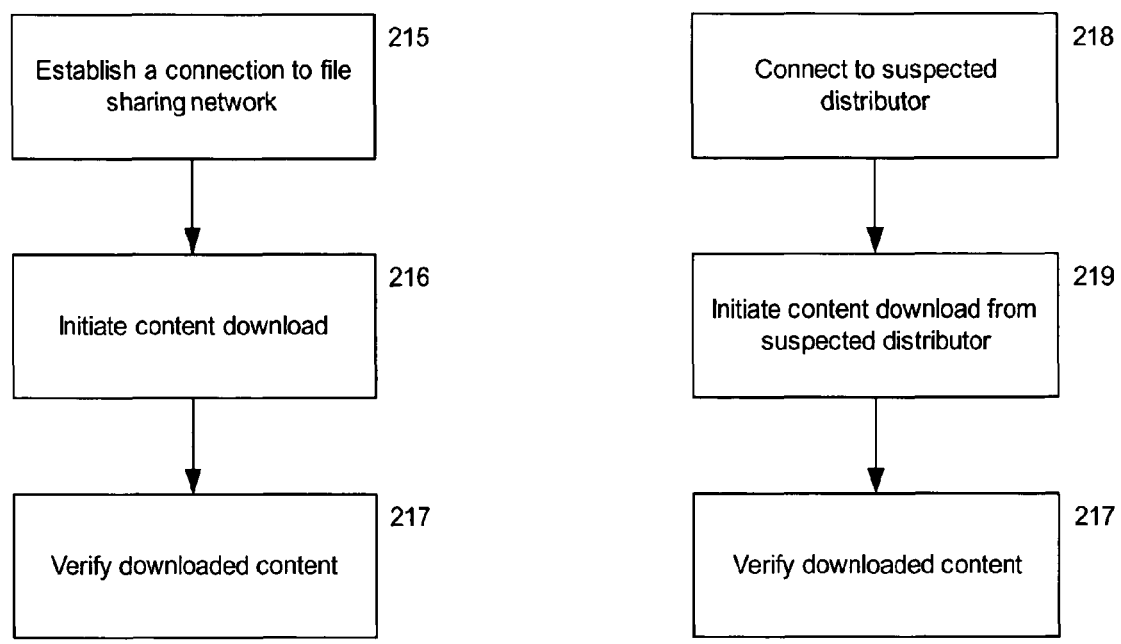
FIG. 5a is a flow diagram illustrating a method for performing a multi-source download of a piece of digital content, according to an embodiment of the present disclosure.
FIG. 5b is a flow diagram illustrating a method for performing a single-source download of a piece of digital content, according to an embodiment of the present disclosure.

FIG. 5a is a flow diagram illustrating a method for performing a multi-source download of a piece of digital content, according to an embodiment of the present disclosure. Establish 215 a connection to file sharing network 104, and initiate 216 a download of the piece of digital content, wherein the file sharing network 104 dynamically arranges download sources for the piece of digital content, and wherein possibly different segments of the piece of digital content are obtained from different download sources. Once content is successfully downloaded, verify 217 that the downloaded content indeed represents the sought piece of digital content. An example of verification step 217 comprises rendering the downloaded content (for example by playing a downloaded video clip or audio clip, or by displaying a downloaded image or document on a viewing screen) and using a human to verify that the downloaded content matches the sought content. Optionally, an internal hash value is computed for the downloaded content, allowing efficient determination of whether the content already exists in primary database 101 and therefore is a duplicate that can be discarded. As another option, the content type may be determined by examining a header of the downloaded content. Note that whereas a successful multi-source download of a piece of sought digital content confirms the suspicion that the content is available over a file sharing network 104, such a multi-source download does not necessarily identify any one person (or entity or IP address) as a distributor of the entire piece of digital content. Optionally, only a portion of the sought digital content is downloaded using multi-source download, establishing that such a portion of the sought content is made available by the file sharing network 104. Optionally, a multi-source download of sought digital content is automatically scheduled to be performed immediately, or at a later time, following the confirmation that a file sharing network 104 advertises availability of such content.

FIG. 5b is a flow diagram illustrating a method for performing a single-source download of a piece of digital content, according to an embodiment of the present invention. Establish 218 a connection to a specific suspected distributor, and initiate 219 a download of the piece of digital content from the suspected distributor. Once content is successfully downloaded, verify 217 that the downloaded content indeed represents the sought piece of digital content. An example of verification step 217 comprises rendering the downloaded content (for example by playing a downloaded video clip or audio clip, or by displaying a downloaded image or document on a viewing screen) and using a human to verify that the downloaded content matches the sought content. Note that in addition to confirming the suspicion that the digital content is available over a file sharing network 104, a single-source download also identifies one person (or entity or IP address) as a distributor of the entire piece of digital content. Optionally, only a portion of the sought digital content is downloaded using single-source download, establishing that such a portion of the sought content is made available by the distributor. Optionally, a single-source download of sought digital content is automatically scheduled to be performed immediately, or at a later time, following the confirmation that a distributor advertises availability of such content from an IP address.

It is an advantageous aspect of the present disclosure that the several different crawler nodes 103 can have several different connections to several different file sharing networks 104, web sites (via spidering), IRC nodes and/or other distribution nodes simultaneously. Optionally, an alert message is issued upon determining that a designated piece of digital content is found to be advertised as available on any one of the file sharing networks 104 to which one or more of the crawler nodes 103 are connected. The alert functionality enables a user to dynamically create and/or edit a "watch list" comprising one or more pieces of digital content, wherein an alert is issued if any piece of digital content on the watch list is suspected to be available on a file sharing network 104.

Figure 6:
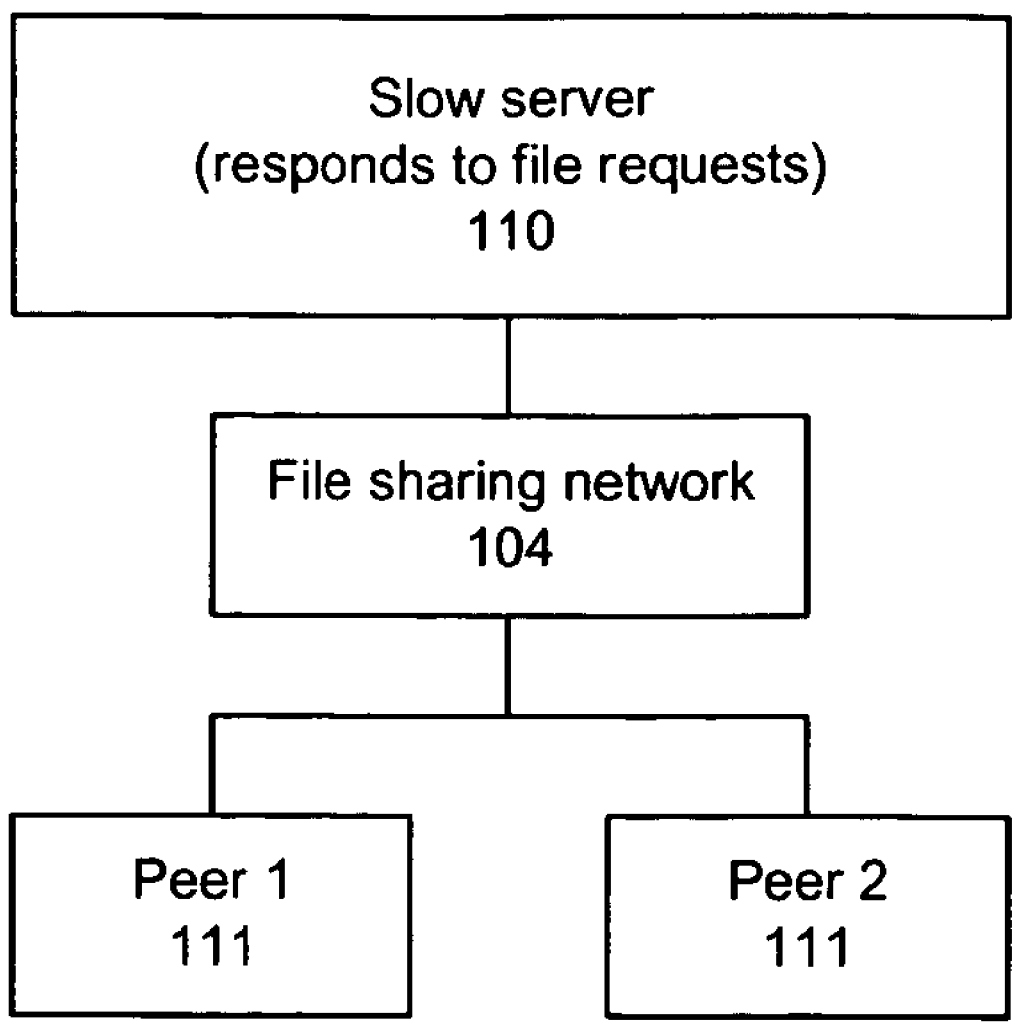
FIG. 6 is a diagram showing a "slow server" 110 emulating a file sharing network 104 client application 113, according to an embodiment of the present disclosure.

In addition to identifying and tracking suspected content distributors, the present disclosure optionally emulates a file sharing network 104 client application 113 on a file sharing network 104 by executing a native file sharing client application 113 appropriate for the file sharing network 104. FIG. 6 is a diagram showing a "slow server" 110 emulating a file sharing network 104 client application 113, according to an embodiment of the present disclosure. The slow server 110 attempts to serve file requests from peers 111 on the file sharing network 104, with the exception that the service is interrupted at the Operating System level by intercepting TCP/IP packets transmitted to and/or from the emulated native client application 113 in order to drop and/or ignore every p packets by not sending an acknowledgement back to the requesting peer 111, thereby causing the TCP stack to fall into "slow packet mode". The number p is tunable and may be initially set for example to drop one out of every three packets, such that enough packets are ignored and/or unacknowledged in order to disrupt content transmission while still responding to system packets and/or status packets in order to have the connection appear intact to requesting peers 111. This arrangement makes it difficult for a peer 111 requesting digital content to obtain the content from the file sharing network 104.

In an alternative embodiment of the present disclosure, distributors participating in an IP telephony protocol are targeted. Crawler node 103 initiates a connection with an IP telephony network (which may be part of a file sharing network 104), searches for any users and/or peers who advertise their presence in an IP telephony directory, and stores any information provided by the IP telephony network and/or file sharing network 104 about such users into primary database 101, analogous to above description for other protocols on Wide Area Networks.

The foregoing described embodiments are provided as illustrations and descriptions. They are not intended to limit the disclosure to precise form described. In particular, it is contemplated that functional implementation of disclosure described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of disclosure not be limited by this Detailed Description, but rather by Claims following.

What is claimed is:

1. A computer program product for identifying a digital content distributor on a file sharing network, the computer program product being encoded on one or more non-transitory machine-readable storage media and comprising:
   instruction for initiating a content search by submitting a search request to the file sharing network, the search request comprising one or more keywords;
   instruction for receiving a result of the content search, the result including a suspect file that comprises a plurality of file segments;
   instruction for downloading each of the file segments by:
      initiating a download of a selected file segment of the suspect file via a specific external identifier on the file sharing network;
      storing the selected file segment received from the file sharing network; and
      recording segment attribute information for the selected file segment, the segment attribute information including source information and a file sharing protocol for the selected file segment;
   instruction for utilizing the source information to determine a distributor for each of the file segments;
   instruction for determining whether the distributor is utilizing a second file sharing protocol;
   instruction for logging the determination whether the distributor is utilizing the second file sharing protocol; and
   instruction for combining the stored file segments to form a digital copy of the suspect file.

2. The computer program product of claim 1, wherein said instruction for initiating the download of the selected file segment comprises instruction for using an external hash on the file sharing network to initiate the download of the selected file segment.

3. The computer program product of claim 1, wherein said instruction for recording the segment attribute information includes instruction for recording a source Internet Protocol (IP) address with the source information for the selected file segment.

4. The computer program product of claim 1, wherein said instruction for recording the segment attribute information includes instruction for recording file size information for the selected file segment.

5. The computer program product of claim 4, wherein said instruction for recording the segment attribute information includes instruction for recording a sequence number of bytes for the selected file segment.

6. The computer program product of claim 1, wherein said instruction for recording the segment attribute information includes instruction for recording a download time and date for the selected file segment.

7. The computer program product of claim 1, wherein said instruction for recording the segment attribute information includes instruction for recording a percentage of the suspect file held by a source of the selected file segment at a given point of time.

8. The computer program product of claim 1, wherein said instruction for recording the segment attribute information includes instruction for recording a file name of the suspect file.

9. A system for identifying a digital content distributor on a file sharing network, comprising:
   a crawler system for initiating a content search by submitting a search request to the file sharing network, the search request comprising one or more keywords;
   said crawler system for receiving a result of the content search, the result including a suspect file that comprises a plurality of file segments;
   said crawler system for downloading each of the file segments by:
      initiating a download of a selected file segment of the suspect file via a specific external identifier on the file sharing network;
      storing the selected file segment received from the file sharing network; and
      recording segment attribute information for the selected file segment, the segment attribute information including source information and a file sharing protocol for the selected file segment;
   a processor-based system for utilizing the source information to determine a distributor for each of the file segments and for determining whether the distributor is utilizing a second file sharing protocol, said processor-based system for logging the determination whether the distributor is utilizing the second file sharing protocol and for combining the stored file segments to form a digital copy of the suspect file.

10. The system of claim 9, wherein said crawler system uses an external hash on the file sharing network to initiate the download of the selected file segment.

11. The system of claim 9, wherein said crawler system records a source Internet Protocol (IP) address with the source information for the selected file segment.

12. The system of claim 9, wherein said crawler system records file size information for the selected file segment.

13. The system of claim 12, wherein said crawler system records a sequence number of bytes for the selected file segment.

14. The system of claim 9, wherein said crawler system records the segment attribute information includes recording a download time and date for the selected file segment.

15. The system of claim 9, wherein said crawler system records a percentage of the suspect file held by a source of the selected file segment at a given point of time.

16. The system of claim 9, wherein said crawler system records a file name of the suspect file.

17. A method for identifying a digital content distributor on a file sharing network, comprising:
   initiating a content search by submitting a search request to the file sharing network, the search request comprising one or more keywords;
   receiving one or more identifiers from the file sharing network, the one or more identifiers indicating a suspected distributor of a piece of digital content, the piece of digital content comprising a result of the search request, the one or more identifiers comprising an Internet Protocol (IP) address of the suspected distributor;
   requesting one or more descriptive data, the one or more descriptive data to generally characterize the piece of digital content;
   performing preliminary filtering on the one or more descriptive data to determine accuracy of search request results;
   validating the IP address of the suspected distributor, whereby the validation effectively confirms that the suspected distributor makes the piece of digital content available on the file sharing network via the validated IP address without downloading the piece of digital content;
   scheduling an automatic download of the piece of digital content to begin at a predetermined time following receiving one or more identifiers from the file sharing network, whereby the download of the piece of digital content effectively confirms a distribution of the piece of digital content by the suspected distributor; and
   logging the validation of the IP address of the suspected distributor.

18. The method of claim 17, wherein the validation of the IP address of the suspected distributor comprises: connecting to the IP address of the suspected distributor; and verifying (a) that the suspected distributor uses a file sharing protocol according to the file sharing network, and (b) that the piece of digital content is available for download from the IP address of the suspected distributor without downloading the piece of digital content.

19. The method of claim 17, further comprising initiating a download of a portion of the piece of digital content via the one or more identifiers.

20. The method of claim 19, further comprising examining a result of the downloaded portion for confirming that the downloaded portion matches a content description disclosed by the suspected distributor.

* * * * *